(12) United States Patent
Dutta et al.

(10) Patent No.: US 6,961,458 B2
(45) Date of Patent: Nov. 1, 2005

(54) METHOD AND APPARATUS FOR PRESENTING 3-DIMENSIONAL OBJECTS TO VISUALLY IMPAIRED USERS

(75) Inventors: Rabindranath Dutta, Austin, TX (US); Janani Janakiraman, Austin, TX (US); Richard Scott Schwerdtfeger, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 09/844,396

(22) Filed: Apr. 27, 2001

(65) Prior Publication Data

US 2002/0159629 A1   Oct. 31, 2002

(51) Int. Cl.[7] ............................................. G06K 9/00
(52) U.S. Cl. ...................... 382/154; 382/114; 382/232; 382/305; 340/825.19; 704/271
(58) Field of Search ................... 382/114, 154, 278, 382/303, 304, 106, 107, 305, 174, 169, 170, 382/237, 232; 701/6, 213, 208; 345/156, 345/836, 158, 856, 702, 978, 163, 728, 168, 345/779, 754, 976, 418, 327, 347, 334; 340/825.19; 709/203, 217, 219; 704/7, 270.1, 271

(56) References Cited

U.S. PATENT DOCUMENTS

| | | | |
|---|---|---|---|
| 3,594,823 A | 7/1971 | Collins et al. | 3/1 |
| 4,073,070 A | 2/1978 | Boston | 35/26 |
| 5,060,062 A | 10/1991 | Dotson | 358/94 |
| 5,246,463 A | 9/1993 | Giampapa | 623/24 |
| 5,459,329 A | 10/1995 | Sinclair | 250/559.29 |
| 5,461,399 A * | 10/1995 | Cragun | 345/729 |
| 5,495,576 A * | 2/1996 | Ritchey | 345/420 |
| 5,511,187 A * | 4/1996 | Cragun | 707/8 |
| 5,636,038 A * | 6/1997 | Lynt et al. | 358/471 |
| 5,650,217 A | 7/1997 | Skrivanek et al. | 428/195 |
| 5,687,331 A * | 11/1997 | Volk et al. | 345/840 |

(Continued)

FOREIGN PATENT DOCUMENTS

GB      2282908 A      4/1995      ............ A45B 3/00

OTHER PUBLICATIONS

N.G. Bourbakis et al., "Intelligent Assistants for Handicapped People's Independence: Case Study", IEEE 1996, pp. 337–344.*

(Continued)

*Primary Examiner*—Chavesh M. Mehta
*Assistant Examiner*—Sheela Chawan
(74) *Attorney, Agent, or Firm*—Duke W. Yee; Marilyn Smith Dawkins; Betty Formby

(57) ABSTRACT

A method and apparatus for examining a three dimensional image in a data processing system. An object is presented, wherein the object includes a set of views for different angles of view for the object. In response to a user input to traverse a view from the set of views, a depth map is transcoded for the view into a non-visual output. In response to other user inputs to present other views from the set of views, depth maps from those views are transcoded into non-visual outputs. In this manner, a visually impaired user is able to perceive a 3-dimensional object.

35 Claims, 5 Drawing Sheets

U.S. PATENT DOCUMENTS

| | | | |
|---|---|---|---|
| 5,736,978 A | 4/1998 | Hasser et al. | 345/173 |
| 5,767,457 A | 6/1998 | Gerpheide et al. | 178/18 |
| 5,784,052 A * | 7/1998 | Keyson | 345/167 |
| 6,005,545 A | 12/1999 | Nishida et al. | 345/150 |
| 6,502,032 B1 * | 12/2002 | Newman | 701/213 |
| 6,664,962 B1 * | 12/2003 | Komsthoeft et al. | 345/426 |
| 6,674,877 B1 * | 1/2004 | Jojic et al. | 382/103 |

OTHER PUBLICATIONS

IBM Technical Disclosure Bulletin, "Pointing Device for Visually Handicapped Users", vol. 38, No. 07, Jul. 1995, pp. 469-471.

IBM Technical Disclosure Bulletin, "New Icons", vol. 39, No. 10, Oct. 1996, pp. 25-27.

* cited by examiner

METHOD AND APPARATUS FOR PRESENTING 3-DIMENSIONAL OBJECTS TO VISUALLY IMPAIRED USERS

CROSS REFERENCE TO RELATED APPLICATIONS

The present invention is related to an application entitled *Apparatus to Convey Depth Information in Graphical Images and Method Therefor*, Ser. No. 09/814,397, filed Mar. 21, 2001, assigned to the same assignee, and incorporated herein by reference.

BACKGROUND OF THE INVENTION

1. Technical Field

The present invention relates generally to an improved data processing system, and in particular to a method and apparatus for processing graphical data. Still more particularly, the present invention provides a method, apparatus, and computer program for presenting 3-dimensional objects to a visually impaired user.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files are formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

Visually impaired users of the Web often rely on tools, such as a talking Web browser. An example of a talking web browser is the Home Page Reader (HPR), which is available from International Business Machines Corporation (IBM). HPR is a spoken on-ramp to the information highway for computer users who are blind or visually impaired. HPR provides Web access by quickly, easily, and efficiently speaking Web page information. HPR provides a simple, easy-to-use interface for navigating and manipulating Web page elements. Using the keyboard to navigate, a user who is blind or who has a visual impairment can hear the full range of Web page content provided in a logical, clear, and understandable manner.

A Web page typically includes content using different types of media. In addition to text, audio and graphical images may be included. The text in a Web page may be spoken using HPR. Audio portions of the Web page are perceivable by a visually impaired user. On the other hand, images, especially 3-dimensional images, in these Web pages are inaccessible to a visually impaired user.

Therefore, it would be advantageous to have an improved method and apparatus for presenting 3-dimensional images to a visually impaired user.

SUMMARY OF THE INVENTION

The present invention provides for a method and apparatus for examining a three dimensional image in a data processing system. An object is presented, wherein the object includes a set of views for different angles of view for the object. In response to a user input to traverse a view from the set of views, a depth map is transcoded for the view into a non-visual output. In response to other user inputs to present other views from the set of views, depth maps from those views are transcoded into non-visual outputs. In this manner, a visually impaired user is able to perceive a 3-dimensional object.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
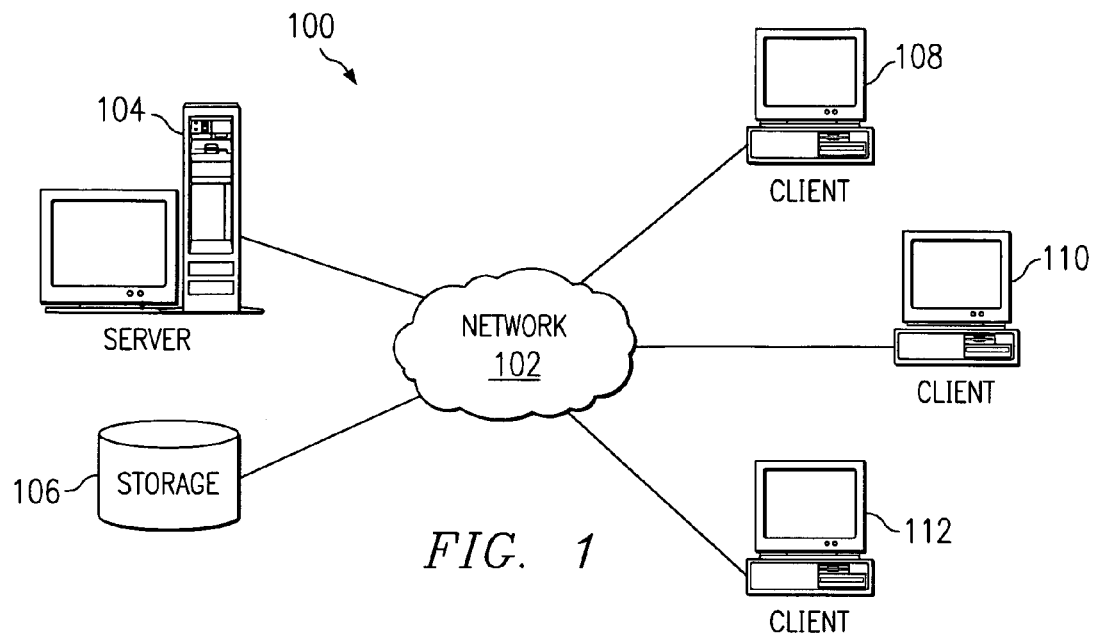
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
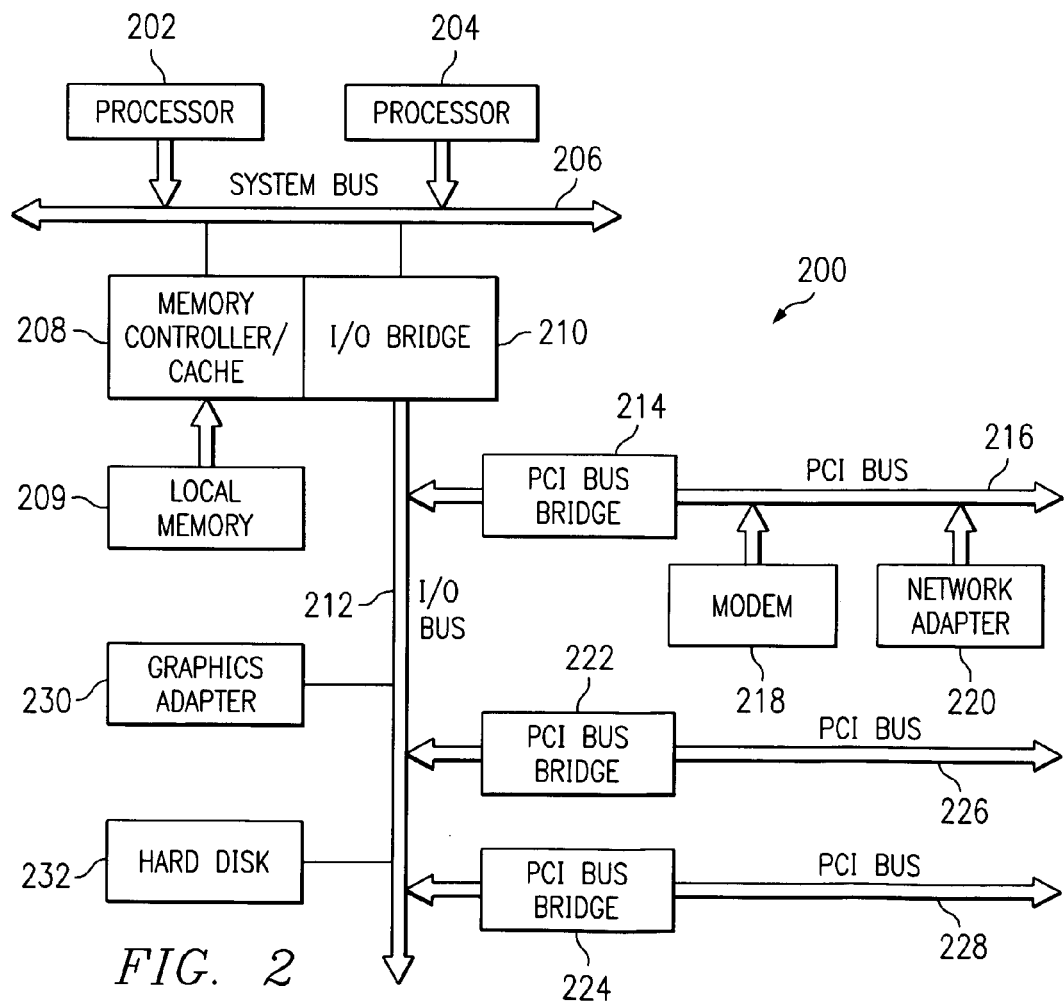
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
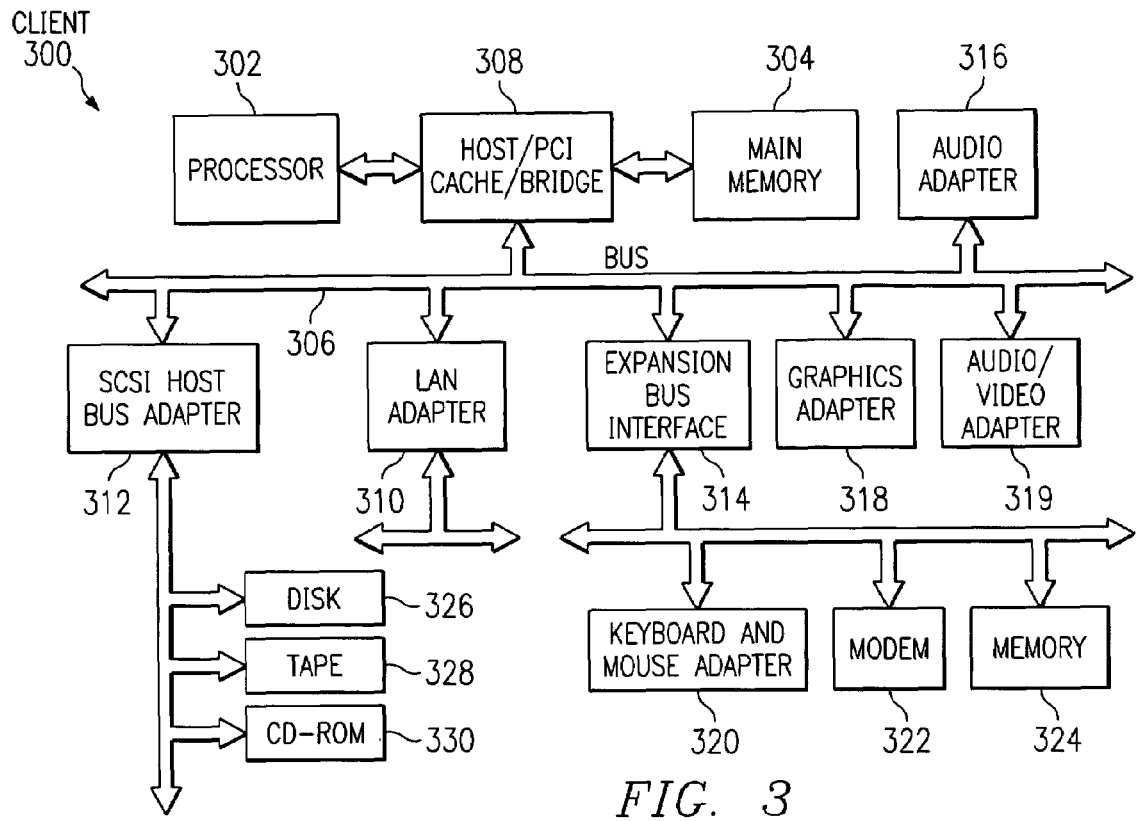
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
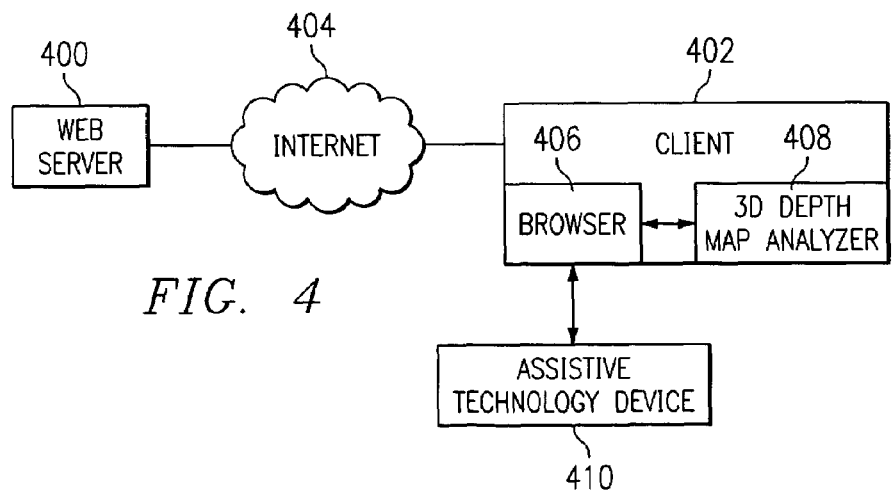
FIG. 4 is a diagram of components in a network data processing system used to present 3-dimensional objects to a visually impaired user in accordance with a preferred embodiment of the present invention.

With reference now to FIG. 4, a diagram of components in a network data processing system used to present 3-dimensional objects to a visually impaired user is depicted in accordance with a preferred embodiment of the present invention. In these examples, images of 3-dimensional objects are incorporated into presentations in Web pages.

Web server 400 may send a Web page to client 402 across Internet 404. The Web page is received at browser 406 for presentation. In the case of a visually impaired user, browser 406 may be a talking Web browser. A browser is an application used to navigate or view information or data in a distributed database, such as the Internet or the World Wide Web. In this example, browser 406 is a talking Web browser, which may be implemented using the Home Page Reader HPR, which is available from International Business Machines Corporation (IBM). In these examples, browser 406 includes a user interface, which includes both a graphical user interface (GUI) and a "visually impaired interface". The GUI allows a normal user to interface or communicate with browser 406, while the visually impaired interface provides a means for a visually handicapped user to navigate a Web page. This visually impaired interface includes an interface that will recognize voice commands as well as commands input from a keyboard.

Most forms of media are presented directly by browser 406. In the depicted examples, however, 3-dimensional images are presented in conjunction with 3-dimensional depth map analyzer 408. In the depicted examples, 3-dimensional depth map analyzer 408 is shown as a separate component from browser 406 for purposes of illustration. This analyzer may be implemented in various ways, such as a plug-in or as a process within browser 406.

The output is typically presented to a user through assistive technology device 410. In many cases, this device is an audio device, but it also may encompass other types of devices, such as a device generating tactile output like Braille.

With respect to 3-dimensional objects, solid modeling involves representing objects as solids using a variety of mechanisms to represent the surface, inside, and outside of a 3-dimensional object. Solid modeling techniques are widely used in computer aided design and graphics. The present invention makes use of depth maps, which are maps of 3-dimensional scenes. Basically, a depth map is a 2-dimensional coordinate showing at each coordinate position the distance of a 3-dimensional scene point. For example, in a depth map a projected 2-dimensional coordinate corresponding to a distant mountain may have a value of 1000 feet, while a projected 2-dimensional coordinate corresponding to a nearby building may have a value of 100 feet. These types of depth maps are well known to those of ordinary skill in the art and may be constructed using stereographic cameras or with a single moving camera. By calculating the movement of pixels of multiple images, a mathematical construction can be made of the depths of various points.

The present invention provides a method, apparatus, and computer program to allow a visually impaired user to traverse or walk in a "virtual" fashion around an object. Solid modeling techniques are used to capture the view of the object from different angles. The different views are sent, in these examples, by Web server 400 to browser 406 with a Web page. The different views may be transcoded or presented using depth maps and texture maps to present the object to the visually impaired user through a non-visual output. This type of output may be, for example, a tactile sensation or an audio presentation of the object to a visually impaired user.

Figure 5:
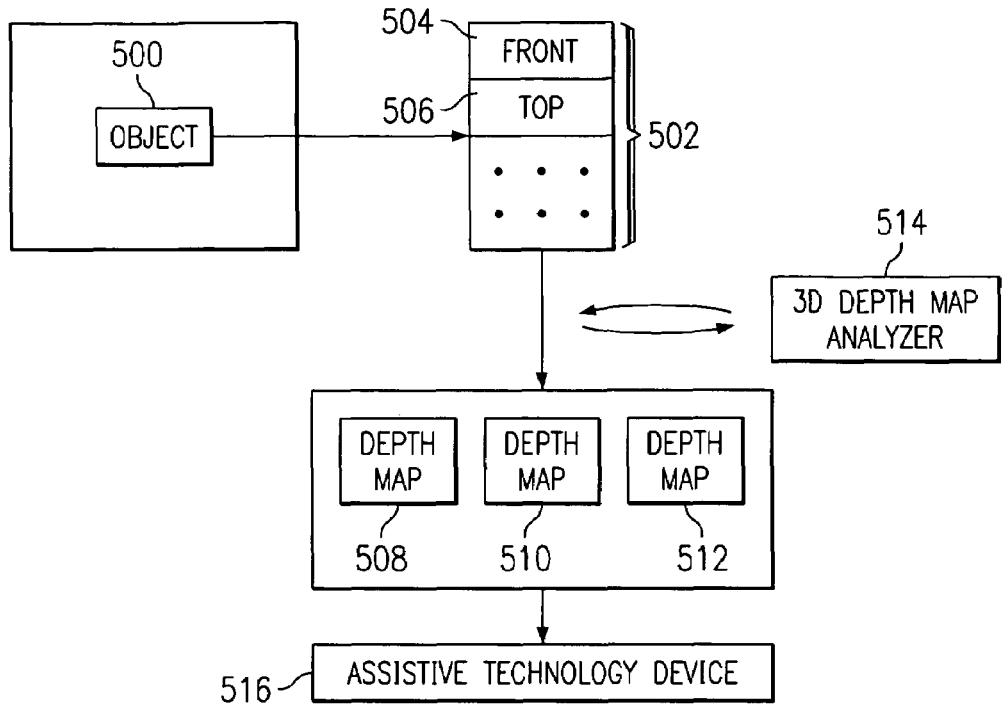
FIG. 5 is a diagram illustrating components in a data processing system used to present a 3-dimensional object to a visually impaired user in accordance with a preferred embodiment of the present invention.

Turning next to FIG. 5, a diagram illustrating components in a data processing system used to present a 3-dimensional object to a visually impaired user is depicted in accordance with a preferred embodiment of the present invention. Object 500 represents a 3-dimensional object that a visually impaired user desires to perceive. In this example, the visually impaired user is presented with menu 502 identifying directions in which the object may be viewed. This menu is presented in response to a user input, such as a "right click" of a mouse button or thorough some other input. Although menu 502 is presented as a pop-up menu, this menu may be traversed with a talking Web browser to audibly present the different options. For example, front 504 or top 506 may be selected. Based on these selections, one of depth maps 508, 510, and 512 may be processed by 3-dimensional depth map analyzer 514 for presentation through assistive technology device 516. For example, depth map 508 may represent a front view of object 500, while depth map 510 represents a top view of object 500. Other depth maps may present other views, such as, for example, a bottom view, a back view, or other views from different angles of object 500. The depth map may be presented on the browser with the non-visual presentation be generated based on the user traversing the depth map.

The transcoding of depth map values is performed by 3-dimensional depth map analyzer 514. In the case of transcoding depth map value for an audio presentation, the values are transcoded or converted into audio signals. Parameters of an audio signal may be varied to provide an identification of different depths, such as, for example, pitch or intensity of an audio signal. For example, if the depth of a point is 20 feet, the transcoded audio signal may be presented at 60 decibels (dB). If the depth is at 10 feet, the audio signal may be presented at 70 dBs. The mapping of the depth to audio volume need not be linear and could be logarithmic. Similar types of transcoding may be performed for tactile presentations.

Figure 6:
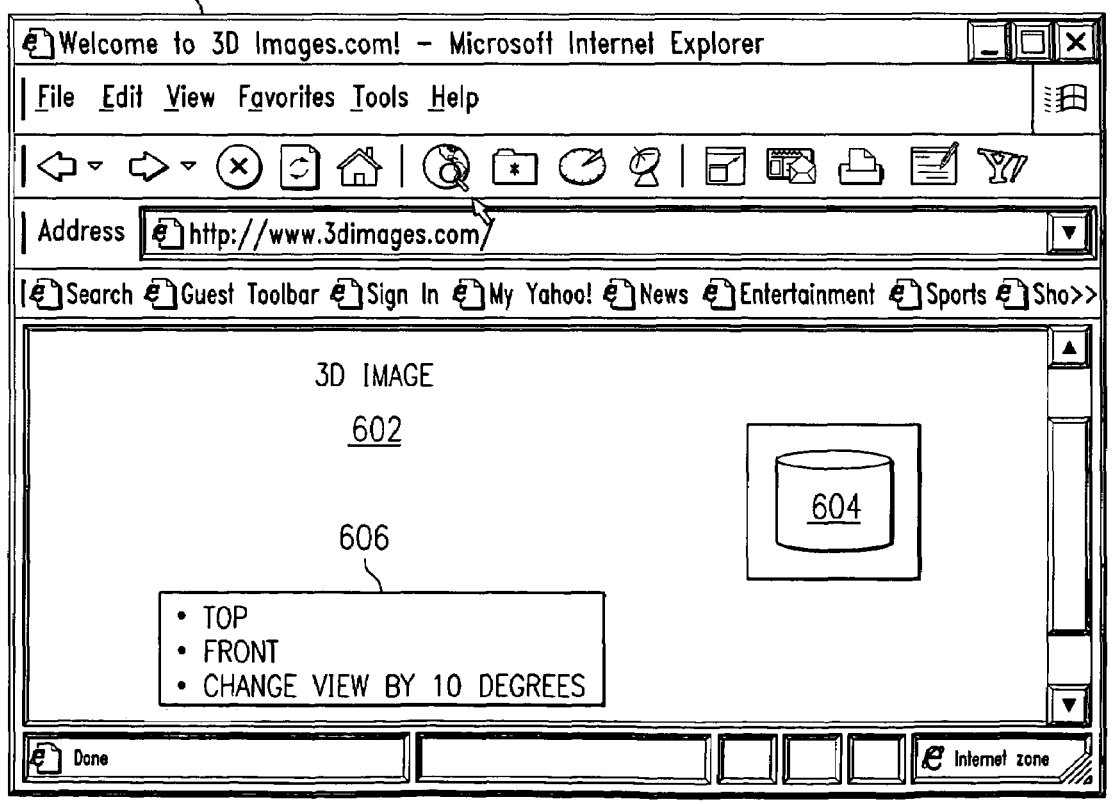
FIG. 6 is a diagram of a Web page with a 3-dimensional object in accordance with a preferred embodiment of the present invention.

With reference now to FIG. 6, a diagram of a Web page with a 3-dimensional object is depicted in accordance with a preferred embodiment of the present invention. As illustrated, browser 600 displays Web page 602 in which object 604 is present. Object 604 is a 3-dimensional object with different angles or perspective, which may be viewed through pop-up menu 606. In this case, object 604 is a cylinder. In this example, pop-up menu 606 allows a front view, a top view, or a change in presentation of the present view by 10 degrees.

Figure 7:
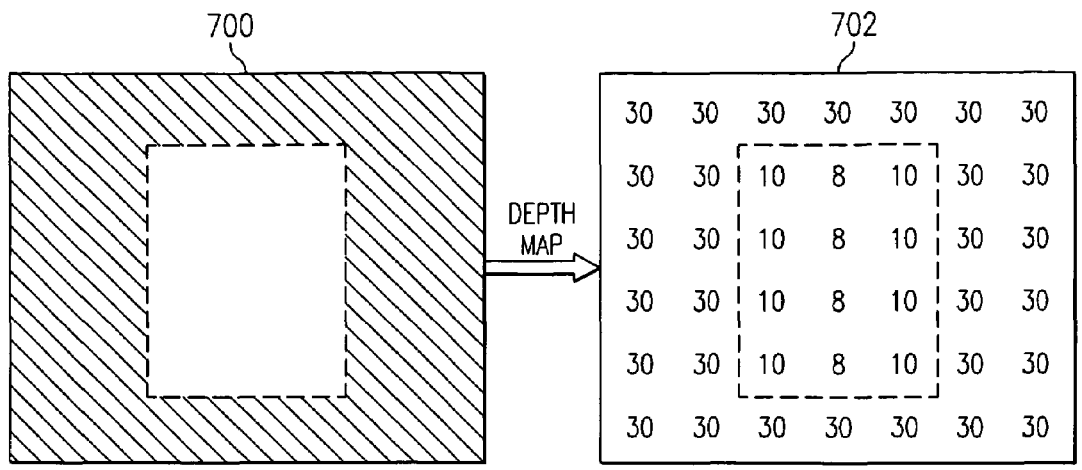
FIG. 7 is a diagram of a depth map of a front view of an object in accordance with a preferred embodiment of the present invention.

Turning next to FIG. 7, a diagram of a depth map of a front view of an object is depicted in accordance with a preferred embodiment of the present invention. In this example image 700 is a front view of object 604, a cylinder, in FIG. 6. Depth map 702 provides values for different portions for image 700. Depth map 702 is transcoded by a 3-dimensional depth map analyzer, such as 3-dimensional depth map analyzer 514 in FIG. 5, to present the front view of object 604. The values of image 700 are 30 for the background, while the values for the cylinder range from 10 to 8 and back to 10 going from left to right to illustrate the curve of the cylinder.

Figure 8:
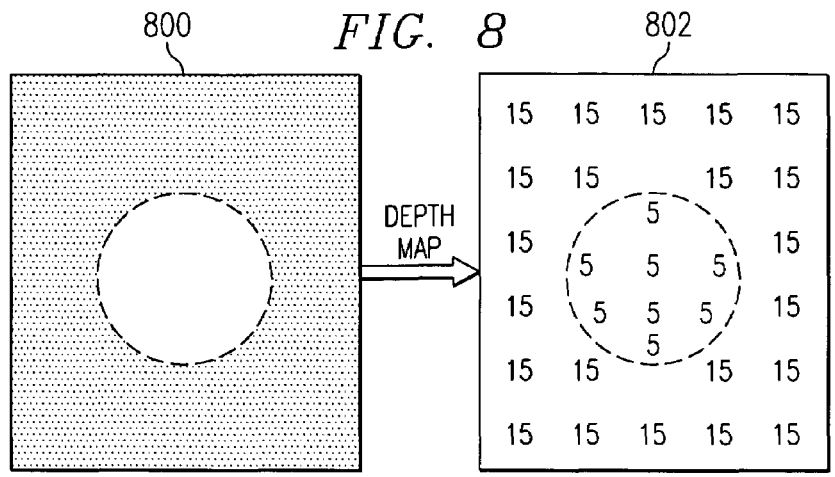
FIG. 8 is a diagram of a depth map for a top view of an object in accordance with a preferred embodiment of the present invention.

With reference now to FIG. 8, a diagram of a depth map for a top view of an object is depicted in accordance with a preferred embodiment of the present invention. In the depicted examples, image 800 is a top view of object 604 in FIG. 6. Depth map 802 provides values for image 800. The background portion of image 800 is represented using values of 15, while the top of object 604 is represented using values of 5.

FIGS. 7 and 8 are presented for purposes of illustration to show different views of a 3-dimensional object, which may be presented to a visually impaired user, in a non-visual manner. Other views, such as a back view, a bottom view, and views from other angles may be presented using depth maps to provide a visually impaired user with a presentation of the 3-dimensional object.

Figure 9:
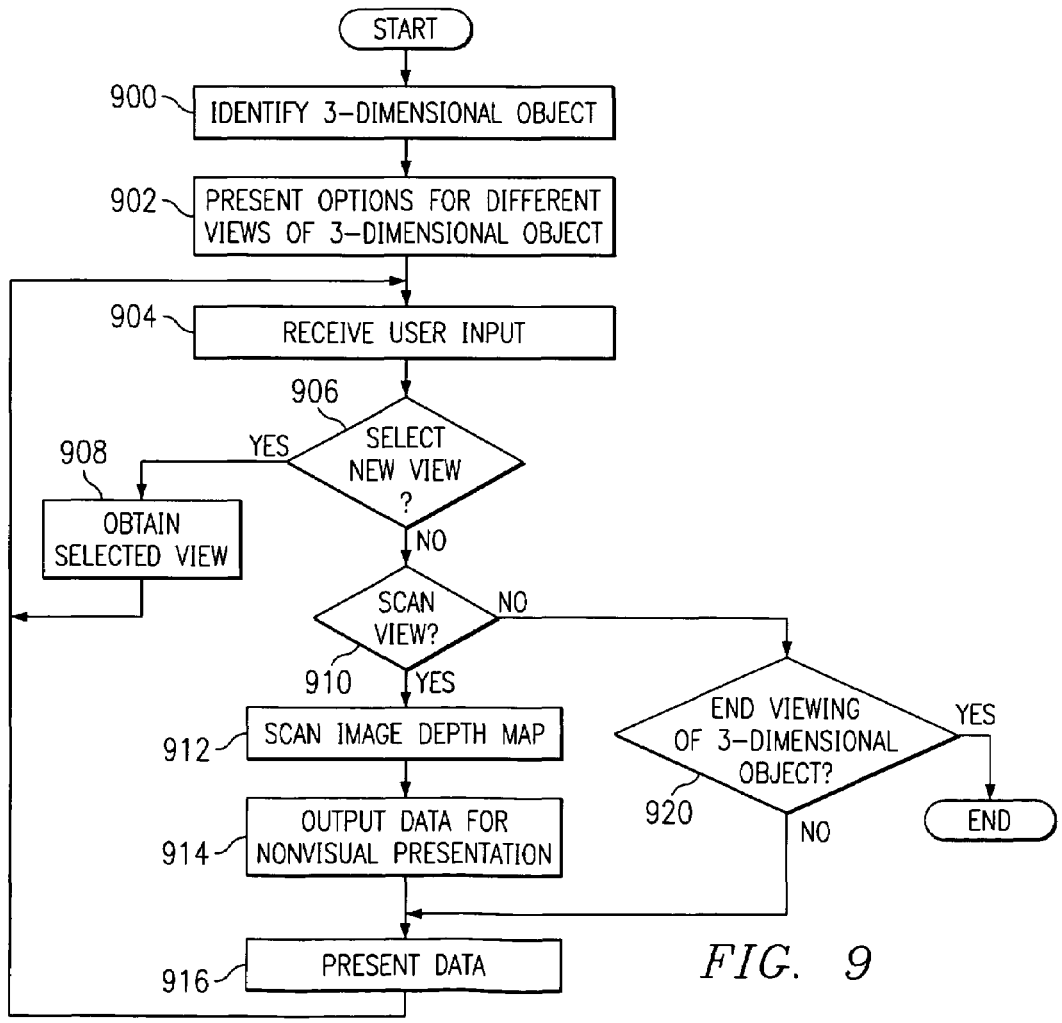
FIG. 9 is a flowchart of a process used for presenting a 3-dimensional object in accordance with a preferred embodiment of the present invention.

Turning next to FIG. 9, a flowchart of a process used for presenting a 3-dimensional object is depicted in accordance with a preferred embodiment of the present invention. The process illustrated in FIG. 9 may be implemented as a computer program or other code for execution by a processor. More specifically, the process may be implemented in browser 406 and 3-dimensional depth map analyzer 408 in FIG. 4.

The process begins by identifying a 3-dimensional object (step 900). Next, options for different views of the 3-dimensional object are presented to a user (step 902). In these examples, the options are presented in a pop-up menu as described above. Then, user input is received (step 904). A determination is made as to whether the user input indicates that a new view has been selected by the user (step 906). If the user input indicates that a new view has been selected, a new view is obtained (step 908) with the process returning to step 904.

Turning back to step 906, if a new view has not been selected, a determination is made as to whether the user input indicates that the view is to be scanned (step 910). If the answer to this determination is yes, then the depth map image is scanned (step 912). This scanning is performed by a 3-dimensional depth map analyzer, in these examples. Next, output data is generated from processing of the depth map in step 912 for a non-visual presentation (step 914). This data may be, for example, different volume levels for different depths in the portion of the depth map scanned in response to the user input. The data is then presented to the user (step 916) with the process returning to step 904. As described above, this presentation may take many different forms, such as audio or tactile.

Turning back to step 910, if the view is not to be scanned, a determination is made as to whether the viewing of 3-dimensional object ends (step 920). If it is determined that the viewing ends, the process terminates. Otherwise, the process proceeds to step 916 as described above.

Figure 10:
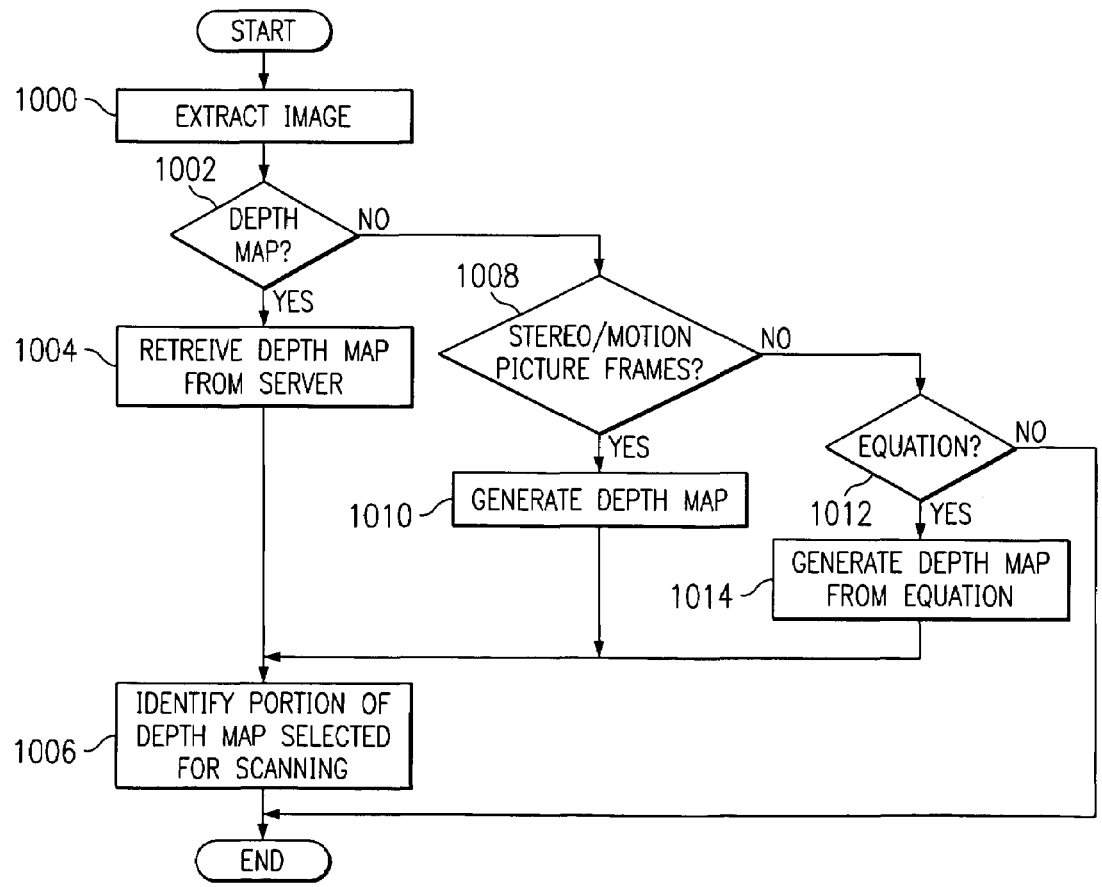
FIG. 10 is a flowchart of a process used for transcoding or scanning a depth map of an image in accordance with a preferred embodiment of the present invention.

With reference now to FIG. 10, a flowchart of a process used for transcoding or scanning a depth map of an image is depicted in accordance with a preferred embodiment of the present invention. The process illustrated in FIG. 10 is a more detailed description of step 912 in FIG. 9.

The process begins by identifying an image for processing (step 1000). Next, a determination is made as to whether a depth map is present for the image (step 1002). In the case of receiving a Web page from a server, depth maps for a 3-dimensional object may be made available from the server.

If a depth map is present, the depth map is retrieved from the server (step 1004). The portion of the depth map scanned by the user input is identified for presentation (step 1006) with the process terminating thereafter. If depth map is not present for the image, a determination is made as to whether stereo/motion picture frames are present for the image (step 1008). If the answer to this determination is yes, a depth map is generated (step 1010) with the process proceeding to step 1006 as described above. If stereo/motion picture frames are absent, a determination is then made as to whether an equation is present for the image (step 1012). If an equation is absent, the process terminates. Otherwise, a depth map is generated from the equation (step 1014) with the process proceeding to step 1006 as described above.

Thus, the mechanism of the present invention allows for a visually impaired user to obtain a non-visual presentation of a 3-dimensional object. When a tactile output is generated, the visually impaired user may obtain a qualitative tactile presentation of the object in a manner analogues to using ones hands to touch objects. The depth of different portions of an object also may be presented in an audible manner in which different parameters of an audio signal are varied to provide an identification of the depth of different portions of an object. These 3-dimensional views are presented through the use of depth maps. Of course the data also may be obtain in other ways, such as through the use of an equation describing an object or through other maps, such as a contour map.

It is important to note that while the present invention has been described in the context of a fully functioning data processing system, those of ordinary skill in the art will appreciate that the processes of the present invention are capable of being distributed in the form of a computer readable medium of instructions, and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a browser for examining a three dimensional image, the method comprising:
    receiving, from a web site, a page that includes an object, wherein the object includes a set of views for different angles of view for the object;
    presenting said object to the user;
    responsive to a user input to traverse a view from the set of views, transcoding a depth map for the view into a non-visual output; and
    sending the non-visual output to an assistive technology device.

2. The method of claim 1 further comprising:
    retrieving the depth map from a server.

3. The method of claim 1 further comprising:
    generating the depth map from the view.

4. The method of claim 1, wherein the set of views is described using an equation and further comprising:
    generating the depth map using the equation.

5. The method of claim 1, wherein the non-visual output is an audio output.

6. The method of claim 1, wherein the non-visual output is a tactile output.

7. The method of claim 1, wherein the transcoding step comprises:
    transcoding a set of adjacent lines within the depth map.

8. A method in a browser for presenting a three dimensional object, the method comprising:
    receiving, from a web site, a page that includes a three-dimensional object, wherein the three-dimensional object includes a set of views for different angles of view for the three-dimensional object;
    presenting options to present different views of the three dimensional object; and
    responsive to user inputs, transcoding depth maps for the different views of the three dimensional object into non-visual outputs to present the different views of the three dimensional object;
    sending means for sending the non-visual output to an assistive technology device.

9. The method of claim 8, wherein the depth maps are received from a server.

10. The method of claim 8, wherein the depth maps are generated at the browser using a set of images for the three dimensional object.

11. The method of claim 8, wherein the depth maps are generated from an equation describing the three dimensional object.

12. The method of claim 8, wherein the non-visual output is an audio output.

13. The method of claim 8, wherein the non-visual output is a tactile output.

14. A data processing system comprising:
    a bus system;
    a communications unit connected to the bus system;
    a memory connected to the bus system, wherein the memory includes as set of instructions; and
    a processing unit connected to the bus system, wherein the processing unit executes the set of instructions to receive, from a web site, a page that includes an object present said object, wherein the object includes a set of views for different angles of view for the object; transcode a depth map for the view into a non-visual output in response to a user input to traverse a view from the set of views; and send the non-visual output to an assistive technology device.

15. A data processing system comprising:
    a bus system;
    a communications unit connected to the bus system;
    a memory connected to the bus system, wherein the memory includes as set of instructions; and
    a processing unit connected to the bus system, wherein the processing unit executes the set of instructions to receive, from a web site, a page that includes an object having different views, presents options regarding different views of the three dimensional object; and transcodes depth maps for the different views of the three dimensional object into non-visual outputs to present the different views of the three dimensional object in response to user inputs, and send the non-visual output to an assistive technology device.

16. A browser for examining a three dimensional image on a web page, the browser comprising:
    receiving means for receiving, from a web site, a web page that includes a set of views for different angles of view for the object;
    presenting means for presenting said object;
    transcoding means, responsive to a user input to traverse a view from the set of views, for trascoding a depth map for the view into a non-visual output; and
    sending means for sending the non-visual output to an assistive technology device.

17. The browser of claim 16 further comprising:
    retrieving means for retrieving the depth map from a server.

18. The browser of claim 16 further comprising:
    generating means for generating the depth map from the view.

19. The browser of claim 16, wherein the set of views is described using an equation and further comprising:
    generating the depth map using the equation.

20. The browser of claim 16, wherein the non-visual output is an audio output.

21. The browser of claim 16, wherein the non-visual output is a tactile output.

22. The browser of claim 16, wherein the transcoding means comprises:
    means for transcoding a set of adjacent lines within the depth map.

23. A computer program product in a computer readable medium for examining a three dimensional image, the computer program product comprising:
    first instructions for receiving, from a website, an object that includes a set of views for different angles of view for the object;
    second instructions for presenting said object;
    third instructions, responsive to a user input to traverse a view from the set of views, for transcoding a depth map for the view into a non-visual output; and
    fourth instructions for sending to non-visual output to an assitive technology device.

24. The computer program product of claim 23 further comprising:

fifth instructions for retrieving the depth map from a server.

25. The computer program product of claim 23 further comprising:
    fifth instructions for generating the depth map from the view.

26. The computer program product of claim 23, wherein the set of views is described using an equation and further comprising:
    fifth instructions for generating the depth map using the equation.

27. The computer program product of claim 23, wherein the non-visual output is an audio output.

28. The computer program product of claim 23, wherein the non-visual output is a tactile output.

29. The computer program product of claim 23, wherein the second instructions comprises:
    sub-instructions for transcoding a set of adjacent lines within the depth map.

30. A computer program product in a computer readable medium for presenting a three dimensional object, the computer program product comprising:
    first instructions for receiving, from a website, an object that includes a set of views for different angles of view for the object;
    second instructions for presenting options to present different views of the three dimensional object;
    third instructions, responsive to user inputs, for transcoding depth maps for the different views of the three dimensional object into non-visual outputs to present the different views of the three dimensional object; and
    fourth instructions for sending the non-visual output to an assistive technology device.

31. The computer program product of claim 30, wherein the depth maps are received from a server.

32. The computer program product of claim 30, wherein the depth maps are generated at the data processing system using a set of images for the three dimensional object.

33. The computer program product of claim 30, wherein the depth maps are generated from an equation describing the three dimensional object.

34. The computer program product of claim 30, wherein the non-visual output is an audio output.

35. The computer program product of claim 30, wherein the non-visual output is a tactile output.

* * * * *